(12) United States Patent
Wanke

(10) Patent No.: US 10,928,138 B2
(45) Date of Patent: Feb. 23, 2021

(54) METHOD AND APPARATUS FOR PRODUCING A BRAZED PLATE HEAT EXCHANGER BLOCK BY SECTIONAL BRAZING

(71) Applicant: Linde Aktiengesellschaft, Munich (DE)

(72) Inventor: Rudolf Wanke, Ottenhofen (DE)

(73) Assignee: Linde Aktiengesellschaft, Munich (DE)

( * ) Notice: Subject to any disclaimer, the term of this patent is extended or adjusted under 35 U.S.C. 154(b) by 204 days.

(21) Appl. No.: 16/170,417

(22) Filed: Oct. 25, 2018

(65) Prior Publication Data

US 2019/0128616 A1    May 2, 2019

(30) Foreign Application Priority Data

Oct. 26, 2017  (EP) .................................... 17020498

(51) Int. Cl.
*F28D 9/00*      (2006.01)
*F28F 3/08*      (2006.01)
(Continued)

(52) U.S. Cl.
CPC ............ *F28D 9/0093* (2013.01); *B23K 1/008* (2013.01); *B23K 1/0012* (2013.01); *F28F 3/08* (2013.01);
(Continued)

(58) Field of Classification Search
CPC .. B23K 1/0012; B23K 1/008; B23K 2101/14; F28D 9/0093; F28F 2275/06; F28F 3/08
(Continued)

(56) References Cited

U.S. PATENT DOCUMENTS

| | | | | |
|---|---|---|---|---|
| 2,909,644 A | * | 10/1959 | Cole | .................. B23K 1/0004 |
| | | | | 219/78.12 |
| 3,087,046 A | * | 4/1963 | Mellinger | ............ B23K 1/0014 |
| | | | | 219/85.17 |

(Continued)

FOREIGN PATENT DOCUMENTS

| | | |
|---|---|---|
| DE | 102010045941 A1 | 3/2012 |
| EP | 1815934 A1 | 8/2007 |
| WO | 2015/132086 A1 | 9/2015 |

OTHER PUBLICATIONS

European Search Report dated May 17, 2018 issued in corresponding EP 17020498.6 application (9 pages).
(Continued)

*Primary Examiner* — Scott R Kastler
*Assistant Examiner* — Michael Aboagye
(74) *Attorney, Agent, or Firm* — Millen White Zelano & Branigan, PC; Brion P. Heaney

(57) ABSTRACT

A method and an apparatus for producing a block for a plate heat exchange is described wherein partition plates and heat-conducting structures are stacked together with brazing material in a block, and the block is subjected to a first force in the vertical direction. A first, upper section of the block is heated to a brazing-material softening temperature, and at the same time, a second section of the block is brought to a tempering temperature which is lower than the brazing-material softening temperature. Subsequently, the block is not subjected to any force from the outside or is subjected to a second force which is lower than the first force, and the second section of the block is brought to a brazing-material softening temperature. At the same time, the first section is brought to a tempering temperature which is lower than the brazing-material softening temperature.

14 Claims, 5 Drawing Sheets

(51) Int. Cl.
  *B23K 1/00* (2006.01)
  *B23K 1/008* (2006.01)
  *B23K 101/14* (2006.01)
(52) U.S. Cl.
  CPC ..... *B23K 2101/14* (2018.08); *F28F 2275/045* (2013.01)
(58) Field of Classification Search
  USPC ......... 148/528; 219/85.1; 29/890.44, 890.03, 29/890.035; 228/183, 262.31, 262.42, 228/262.45, 262.9; 165/153, 69, 76, 173, 165/175
  See application file for complete search history.

(56) References Cited

U.S. PATENT DOCUMENTS

| | | | | |
|---|---|---|---|---|
| 3,284,607 | A | * 11/1966 | Wernz | B23K 1/0014 219/85.17 |
| 4,326,117 | A | * 4/1982 | Kanne, Jr. | B23K 11/00 219/85.15 |
| 4,480,165 | A | 10/1984 | Haushalter et al. | |
| 4,622,445 | A | * 11/1986 | Matsen | B23K 1/002 219/615 |

OTHER PUBLICATIONS

English Abstract of EP 1815934 A1 published Aug. 8, 2007.
English Abstract of DE 102010045941 A1 published Mar. 22, 2012.

\* cited by examiner a b

METHOD AND APPARATUS FOR PRODUCING A BRAZED PLATE HEAT EXCHANGER BLOCK BY SECTIONAL BRAZING

The invention relates to a method and an apparatus for producing a brazed plate heat exchanger block and to a method for producing a plate heat exchanger.

Plate heat exchangers are known from the prior art, which are designed to transfer the heat of a first fluid or of a first fluid group indirectly to a different, second fluid or to a different second fluid group. Here, the fluids are guided in the plate heat exchanger in separate heat exchange passages of the plate heat exchanger block. The heat exchange passages are bounded by in each case two parallel partition plates of the plate heat exchanger block, between which in each case a heat-conducting structure is arranged, which is also referred to as a fin.

Such plate heat exchanger blocks are shown and described for example in "The standards of the brazed aluminium plate-fin heat exchanger manufacturers' association" ALPEMA, third edition, 2010. Such a plate heat exchanger block has a plurality of partition plates arranged parallel to one another, generally in the form of partition sheets, which form a multiplicity of heat exchange passages for the fluids to be brought into indirect exchange of heat with one another. The heat exchange between the fluids involved in the heat exchange takes place here between adjacent heat exchange passages, wherein the heat exchange passages and thus the fluids are separated from one another by the partition plates. The heat exchange takes place by means of heat transfer via the partition plates and by means of the heat-conducting structures (fins) arranged between the partition plates. The heat exchange passages are terminated toward the outside by edge strips (for example in the form of sheet strips), also known as side bars, attached to the edge of the partition sheets in a flush manner. The plate heat exchanger block is furthermore bounded toward the outside by two outermost partition plates, which are referred to as cover plates. The cover plates are usually likewise configured in the form of planar sheets, but these generally have a greater material thickness than the internal partition sheets.

Such plate heat exchangers are preferably formed from aluminum, wherein the components are connected together by brazing.

According to the prior art, in the production of such a plate heat exchanger block, a stack of the components, generally made of braze-clad partition plates, heat-conducting structures (fins) and edge strips (side bars), is formed. Subsequently, the stack is brought to the temperature necessary for brazing (also referred to as brazing-material softening temperature in the following text) in a vacuum brazing furnace. The components pass into the softened brazing material and are brazed together thereby.

During brazing, it is generally necessary to fix the components arranged to form a stack in a clamping device. However, this entails the problem that components of the plate heat exchanger block, in particular thin-walled heat-conducting structures (fins) can be permanently deformed (for example bent out of shape or squashed) under the action of the clamping force. This can result in the heat exchange capacity of the plate heat exchanger being limited, since some heat exchange passages are no longer permeable to the fluids as a result of the mechanical deformation of the heat-conducting structures.

The described problems arise particularly in a lower section of the plate heat exchanger block. Here, not only the clamping force acts on the block, but also the weight force of that section of the plate heat exchanger block that is located thereabove. In addition, the strength of the components, for example of the heat-conducting structures, is reduced at the brazing-material softening temperature compared with the strength under normal conditions, and so they can deform particularly easily during brazing.

This leads to the object of providing a method for producing a plate heat exchanger block which is improved with regard to the described drawbacks of the prior art.

This object is achieved by the method for producing a block wherein:

(a) the block is subjected in the vertical direction to a first force which acts on the block from the outside, and a first, upper section of the block is heated to a brazing-material softening temperature at which the brazing material softens, such that the upper section is brazed, and wherein, at the same time, a second section of the block, which adjoins the first section downwardly in the vertical direction, is brought to a tempering temperature which is lower than the brazing-material softening temperature and above the ambient temperature and at which the brazing material does not soften, and wherein, following (a), (b) the block is not subjected in the vertical direction to any force from the outside or is subjected to a second force which acts on the block from the outside, wherein the second force is lower than the first force, and the second section of the block is brought to a brazing-material softening temperature at which the brazing material softens, such that the second section is brazed, and wherein, at the same time, the first section is brought to a tempering temperature which is lower than the brazing-material softening temperature and above the ambient temperature and at which the brazing material hardens or does not soften.

This object is also achieved by an apparatus for producing a brazed block for a plate heat exchanger wherein:

a heating apparatus is configured to heat a first, upper section of a block comprising a plurality of partition plates and a plurality of heat-conducting structures, which are stacked together with brazing material in the vertical direction in a block, to a brazing-material softening temperature at which the brazing material softens, and at the same time to bring a second section of the block, which adjoins the first section downwardly in the vertical direction, to a tempering temperature which is lower than the brazing-material softening temperature and above the ambient temperature and at which the brazing material does not soften, and subsequently to heat the second section to a brazing-material softening temperature) at which the brazing material softens, and to bring the upper section to a tempering temperature which is lower than the brazing-material softening temperature and above the ambient temperature and at which the brazing material does not soften, and a clamping apparatus which is configured to subject the block in the vertical direction to a first force acting on the block from the outside, while the upper section of the block is heated to the brazing-material softening temperature, and to not subject the block in the vertical direction to any force from the outside or to subject it to a second force, while the second section of the block is heated to the brazing-material softening temperature, wherein the second force is lower than the first force.

A first aspect of the invention relates to a method for producing a brazed block (also referred to as plate heat exchanger block) for a plate heat exchanger, wherein the block has a plurality of heat exchange passages for indirect heat exchange between at least two fluids, wherein first of all a plurality of partition plates and heat-conducting structures are stacked together with brazing material in the vertical direction in a block, wherein subsequently, in a first step, the block is subjected in the vertical direction to a first force which acts on the block from the outside, and a first, upper section of the block is heated to a brazing-material softening temperature at which the brazing material softens, such that the upper section is brazed (i.e. in particular such that the heat-conducting structures and partition plates or cover plates of the first section are brazed), wherein, at the same time, a second section of the block, which adjoins the first section downwardly in the vertical direction, is brought to a tempering temperature which is lower than the brazing-material softening temperature and above the ambient temperature and at which the brazing material does not soften, and wherein, following the first step, in a second step, the block is not subjected in the vertical direction to any force from the outside or is subjected to a second force which acts on the block from the outside, wherein the second force is lower than the first force, and the second section of the block is brought to a brazing-material softening temperature at which the brazing material softens, such that the second section is brazed (i.e. such that in particular the heat-conducting structures and partition plates or cover plates of the second section are brazed), and wherein, at the same time, the first section is brought to a tempering temperature which is lower than the brazing-material softening temperature and above the ambient temperature and at which the brazing material hardens or does not soften.

Here, said upper section of the block is bounded upwardly in particular by an uppermost partition plate or cover plate.

Heat-conducting structures should be understood in particular as being heating surface elements (also referred to as fins) and distributor fins.

In particular, the brazing material is applied to the partition plates or heat-conducting structures as a layer (for example clad) or a brazing-material layer is laid between the partition plates and the heat-conducting structures during the stacking of the block.

The components of the block that are to be brazed are extended in particular in a layered manner transversely to the vertical direction.

The first and the second force, which act on the block in the vertical direction, have an effect in particular on the uppermost (outermost) partition plates or cover plates of the block.

The ambient temperature should be understood as being that temperature that prevails outside the block, in particular outside a brazing furnace in which the block is brazed, during a brazing of the block.

The softening of the brazing material denotes the transition into a flowable or pasty state in which the brazing material is capable of forming a brazed connection between the components of the block that are to be brazed.

The difference between the brazing-material softening temperature and the tempering temperature is chosen in particular such that the differences in thermal expansion between the upper section and the second section are sufficiently small for the plate heat exchanger block to be brazed.

The tempering temperature and the external force (for example the first and second force) exerted on the block are chosen in particular such that the components of the second section are not permanently deformed under the action of the external force.

According to the invention, the entire plate heat exchanger block is not heated to the temperature required for brazing all at the same time, but rather the brazing takes place incrementally from top to bottom (sectional brazing, zonal brazing).

In the second step of the method, in which the second section is at the brazing-material softening temperature and is thus relatively easily deformable, in addition to the external second force, the weight force of the upper section or only the weight force of the upper section (if the block is not subjected to an external force in the second step) acts on said second section. Since, according to the invention, the second force is lower than the first force or only the weight force of the upper section acts, the second section is not permanently deformed at the brazing-material softening temperature.

The tempering temperature of the second section during the brazing of the upper section can in particular be equal to the tempering temperature of the upper section during the brazing of the second section. Alternatively, the tempering temperatures of the upper section and of the second section can be different.

It goes without saying that said sections can merge seamlessly into one another. This means in particular that, in each of the boundary regions between the sections, there can be a temperature gradient between the brazing-material softening temperature and the tempering temperature.

Furthermore, the method can also be carried out in an analogous manner with as many sections and steps as desired. Alternatively, rather than in individual steps, the method can also be carried out continuously, for example in that the section of the block that is at the brazing-material softening temperature, i.e. the region to be brazed, is moved continuously from top to bottom during the method, while the external force on the plate heat exchanger block is continuously lowered.

As components, the plate heat exchanger block has in particular partition plates, edge strips and heat-conducting structures, wherein the heat exchange passages are arranged in each case between two parallel partition plates, and wherein a heat-conducting structure (for example a heating surface element or fin or a distributor fin) is arranged in each particular heat exchange passage, and wherein each particular heat exchange passage is bounded to the sides by edge strips (also referred to as side bars herein), which are arranged between the two partition plates bounding the particular heat exchange passage, wherein each particular heat-conducting structure has alternately arranged peaks and valleys which are connected together via flanks.

During brazing, in particular a metallurgical compound is produced between the relevant components of the block and the brazing material.

In the context of the present invention, a metallurgical compound between the brazing material and each particular component (for example side bar, fin or partition plate) is understood as being in particular an intermetallic compound (i.e. between a metal or a metal alloy of the brazing material and a metal or a metal alloy of the relevant component), for example by cohesive joining of metals/metal alloys of the particular component and the brazing material.

The brazing of the block is carried out in particular at a pressure that is lower than the ambient pressure, for example under at least partial vacuum in a vacuum furnace. Alternatively, the brazing operation can also take place at ambient pressure, wherein a flux is made available at the components to be brazed.

The method according to the invention yields the advantage that the components of the block, in particular in its second or lower section, are not deformed and damaged by the external force necessary for brazing during the brazing of the components. This eliminates the impairment of the heat exchange capacity of the block caused by the deformed components.

In addition, with the method according to the invention, it is possible to jointly braze (as one part) a plate heat exchanger block with a greater height (in the vertical direction) than with the methods according to the prior art.

According to one embodiment, the first section is formed by an upper half and the second section by a lower half of the block.

According to a further embodiment, the block comprises a further, third section which adjoins the second section downwardly in the vertical direction, wherein, following the second step, in a third step, the block is not subjected to any force from the outside, and the third section of the block is brought to a brazing-material softening temperature at which the brazing material softens, and, at the same time, the second section is brought to a tempering temperature which is lower than the brazing-material softening temperature and above the ambient temperature and at which the brazing material hardens or does not soften.

Here, in particular during the brazing of the second section (i.e. in the second step) and during the brazing of the third section (i.e. in the third step), the upper section is also brought to or maintained at the tempering temperature.

According to a further embodiment, the first, upper section is formed by an upper third of the block, wherein the second section is formed by a middle third of the block, and wherein the third section is formed by a lower third of the block.

According to a further embodiment, the first force and the second force are applied to the block by means of at least one loaded spring, wherein the at least one loaded spring acts preferably from above on the outermost, upper partition plate, or cover plate, of the block.

It goes without saying that, alternatively, other means for force transmission that are known to a person skilled in the art can be used in the method according to the invention, in order to provide the external force. Of course, it is also possible for only one means for force transmission to be used, wherein forces of different sizes are settable in order to provide different clamping forces.

According to a further embodiment, during the brazing of the upper section in the first step, the block is subjected by means of a first loaded spring and a second loaded spring to an aggregated force which corresponds to the sum of the forces exerted on the block by the first loaded spring and the second loaded spring, and wherein, during the brazing of the second section, the block is subjected to the second force only by means of the second loaded spring.

According to a further embodiment, following the brazing of the first, upper section in the first step, the first spring comes to bear against a first stop, such that the first spring no longer acts on the block, wherein, following the brazing of the second section, the second spring comes to bear against a second stop, such that the second spring no longer acts on the block.

In other words, the first spring no longer exerts any force on the plate heat exchanger block when it comes into contact with the first stop, and the second spring no longer exerts any force on the plate heat exchanger when it comes into contact with the second stop.

The described method can of course also be carried out analogously with as many springs and stops as desired.

According to a further embodiment, the heat-conducting structures are formed by corrugated plates.

According to a further embodiment, as components of the plate heat exchanger block that are to be brazed, at least a plurality of partition plates are stacked on top of one another, wherein a fin or a distributor fin is arranged between in each case two adjacent partition plates.

Particularly fins and distributor fins have a lamellar (or peaks and valleys) structure, and so these components can be deformed particularly easily by an excessive force in the vertical direction during the brazing method.

According to a further embodiment, during the stacking of the partition plates and heat-conducting structures, edge strips are arranged between adjacent partition plates, said edge strips terminating each particular heat exchange passage toward the outside.

According to a further embodiment, the tempering temperature is in a range from 5° C. to 150° C., in particular 30° C. to 100° C., below the brazing-material softening temperature.

According to a further embodiment, the tempering temperature is 5° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C. or 150° C. below the brazing-material softening temperature.

A second aspect of the invention relates to a method for producing a plate heat exchanger having at least one block produced by a method according to the first aspect of the invention, wherein, following the first and second steps, in particular following the first, second and third steps, at least one port and/or at least one manifold is connected to the block, in particular welded onto the block.

A third aspect of the invention relates to an apparatus for producing a brazed block for a plate heat exchanger, in particular as per the method according to the first aspect of the invention, wherein the apparatus for producing a brazed block has a heating apparatus (for example a brazing furnace), which is configured to heat a first, upper section of a block comprising a plurality of partition plates and a plurality of heat-conducting structures, which are stacked together with brazing material in the vertical direction in a block, to a brazing-material softening temperature at which the brazing material softens, and at the same time to bring a second section of the block, which adjoins the first section downwardly in the vertical direction, to a tempering temperature which is lower than the brazing-material softening temperature and above the ambient temperature and at which the brazing material does not soften, and subsequently to heat the second section to a brazing-material softening temperature at which the brazing material softens, and to bring the upper section to a tempering temperature which is lower than the brazing-material softening temperature and above the ambient temperature and at which the brazing material does not soften, and wherein the apparatus for producing a brazed block also has a clamping apparatus (for example a clamping frame) which is configured to subject the block in the vertical direction to a first force acting on the block from the outside, while the upper section of the block is heated to the brazing-material softening temperature, and to not subject the block in the vertical direction (V) to any force from the outside or to subject it to a second force, while the second section of the block is heated to the brazing-material softening temperature, wherein the second force is lower than the first force.

According to one embodiment of the apparatus for producing a brazed block, the clamping apparatus has at least one spring, wherein the clamping apparatus is configured to apply the first and second force, acting preferably from above on the outermost, upper partition plate or cover plate of the block, to the block by means of the loaded at least one spring.

According to a further embodiment, the clamping apparatus has a first plate and a second plate parallel to the first plate, wherein the first plate is connected to the second plate via at least one guide (for example a guide rod or guide rail), such that at least the first plate is movable along the at least one guide, wherein the at least one spring is configured to exert a force acting parallel to the at least one guide on the first plate. In this case, the clamping apparatus is configured in particular such that the block is positionable between the first plate and the second plate, and such that the block can be subjected to the first and second force by means of the at least one loaded spring via the first plate.

According to a further embodiment, the clamping apparatus is configured to subject the block, during the brazing of the upper section, to an aggregated force by means of a first loaded spring and a second loaded spring, wherein the aggregated force corresponds to the sum of the forces exerted on the block by the first spring and the second spring, and wherein the clamping apparatus is configured to subject the block, during the brazing of the second section, to the second force only by means of the second loaded spring.

According to a further embodiment, the clamping apparatus has a first stop, wherein the clamping apparatus is configured such that, following the brazing of the first, upper section, the first spring comes to bear against the first stop, such that the first spring no longer acts on the block, and wherein the clamping apparatus has a second stop, wherein the clamping apparatus is configured such that, following the brazing of the second section, the second spring comes to bear against the second stop, such that the second spring no longer acts on the block.

BRIEF DESCRIPTION OF THE DRAWINGS

Further features and advantages of the present invention will be described in the following descriptions of figures of exemplary embodiments of the invention with reference to the figures, in which:

FIG. 1 shows by way of example a plate heat exchanger 10 having a block 11, as is producible with the method according to the invention. The plate heat exchanger 10 has a plate heat exchanger block 11 having partition plates (for example in the form of partition sheets) 4 arranged parallel to one another, said partition plates 4 forming a multiplicity of heat exchange passages 1 for the fluids A, B, C, D, E to be brought into indirect exchange of heat with one another. The partition plates 4 consist for example of an aluminum alloy. The heat exchange between the fluids involved in the heat exchange takes place here between adjacent heat exchange passages 1, wherein the heat exchange passages 1 and thus the fluids are separated from one another by the partition plates 4. The heat exchange takes place by means of heat transfer via the partition plates 4 and via the heating surface elements (fins) 3 which are arranged between the partition plates 4 and can in particular likewise consist of an aluminum alloy. The heat exchange passages 1 are terminated toward the outside by edge strips in the form of sheet strips 8, also referred to as side bars 8 below, attached to the edge of the partition plates 4 in a flush manner.

Figure 1:
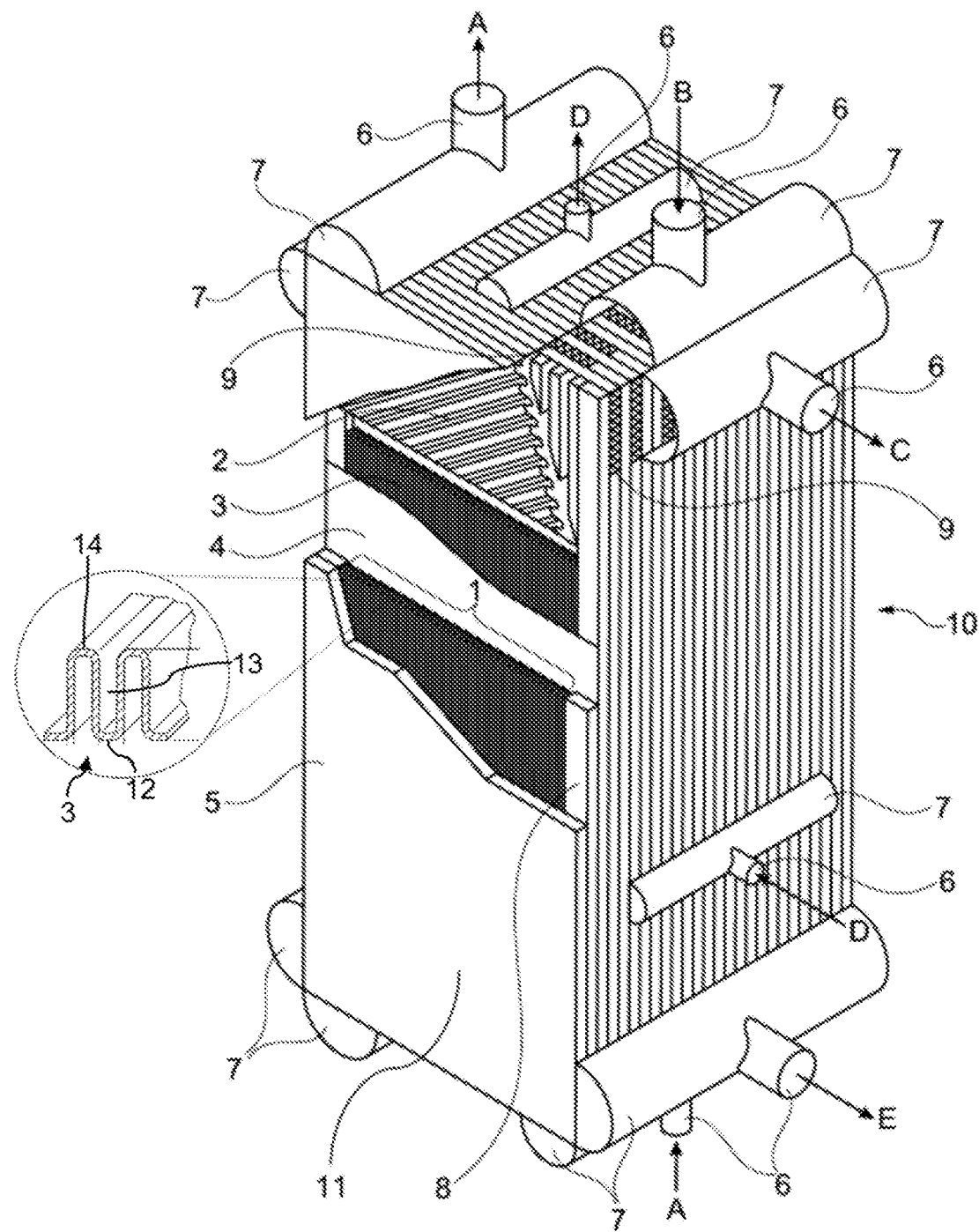
FIG. 1 shows a perspective illustration of a plate heat exchanger.

Said side bars 8 can likewise consist of an aluminum alloy. The corrugated fins 3 are arranged within the heat exchange passages 1, or between in each case two partition plates 4, wherein a cross section of a fin 3 is shown in the detail of FIG. 1. According thereto, the fins 3 each have a wave-shaped structure with alternating valleys 12 and peaks 14, wherein each valley 12 is connected to an adjacent peak 14 via a flank 13 of the relevant fin 3, resulting in the wave-shaped structure. The wave-shaped structure does not have to be formed in a rounded manner, but can also have a rectangular or step-shaped design. As a result of the wave-shaped structure, channels for guiding the fluid in each particular heat exchange passage 1 are formed—together with the partition plates 4 on both sides. The peaks 14 and valleys 12 of the wave-shaped structure of the particular fin 3 are connected to the respectively adjacent partition plates 4. The fluids involved in the heat exchange are thus in direct thermal contact with the wave-shaped structures 3, such that the heat transfer is ensured by the thermal contact between the peaks 14 or valleys 12 and the partition plates 4. In order to optimize the heat transfer, the orientation of the wave-shaped structure is chosen depending on the particular application so as to allow concurrent flow, cross flow, counter flow or cross-counter flow between adjacent passages.

The plate heat exchanger 10 also has openings 9 to the heat exchange passages 1, for example at the ends of the plate heat exchanger 10 or in a middle section, it being possible for fluids A, B, C, D, E to be introduced into the heat exchange passages 1 or drawn out of the latter via said openings 9. In the region of these openings 9, it is possible for the individual heat exchange passages 1 to have distributor fins 2 which distribute the particular fluid to the channels of a fin 3 of the relevant heat exchange passage 1. A fluid A, B, C, D, E can be introduced into an opening 9 in the plate heat exchanger block 11 for example via a port 6 and a manifold 7, be introduced into the associated heat exchange passage 1 via said opening 9, and drawn back out of the relevant heat exchange passage 1 through a further opening 9.

The partition plates 4, fins 3 and side bars 8 and optionally further components (for example distributor fins 2) are connected together using the method according to the invention by soldering or brazing, preferably brazing.

Figure 2:
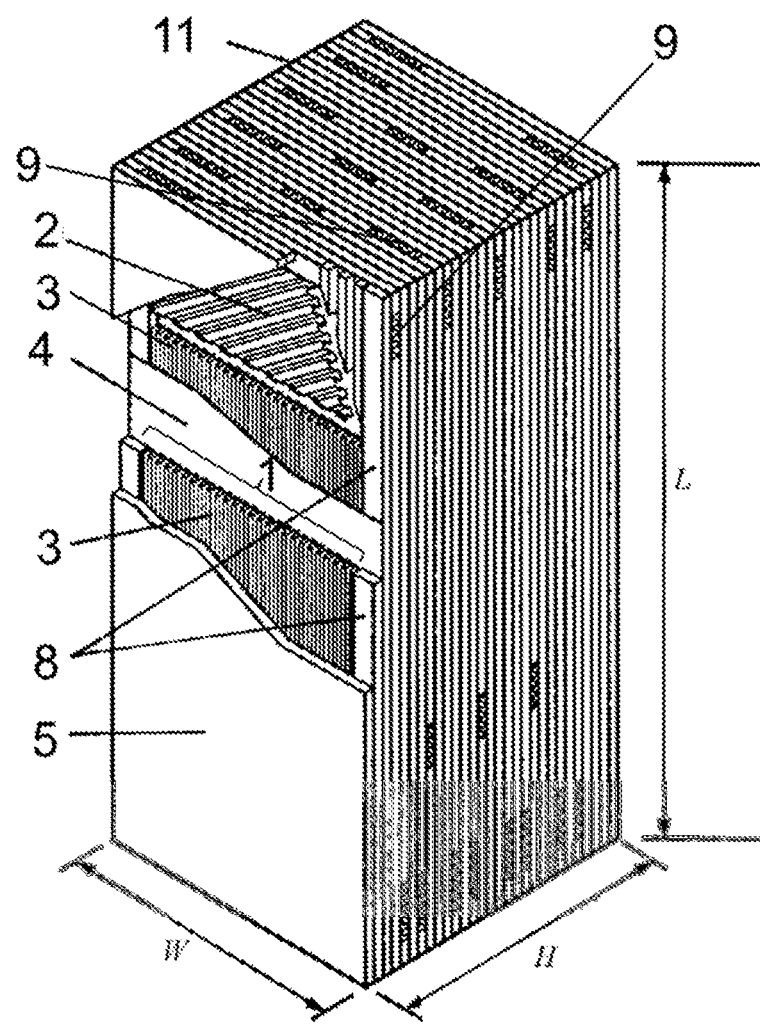
FIG. 2 shows a perspective illustration of a block produced by the method according to the invention.

FIG. 2 shows, for a better overview, the plate heat exchanger block 11 without the port 6 and manifold 7.

Figure 3:
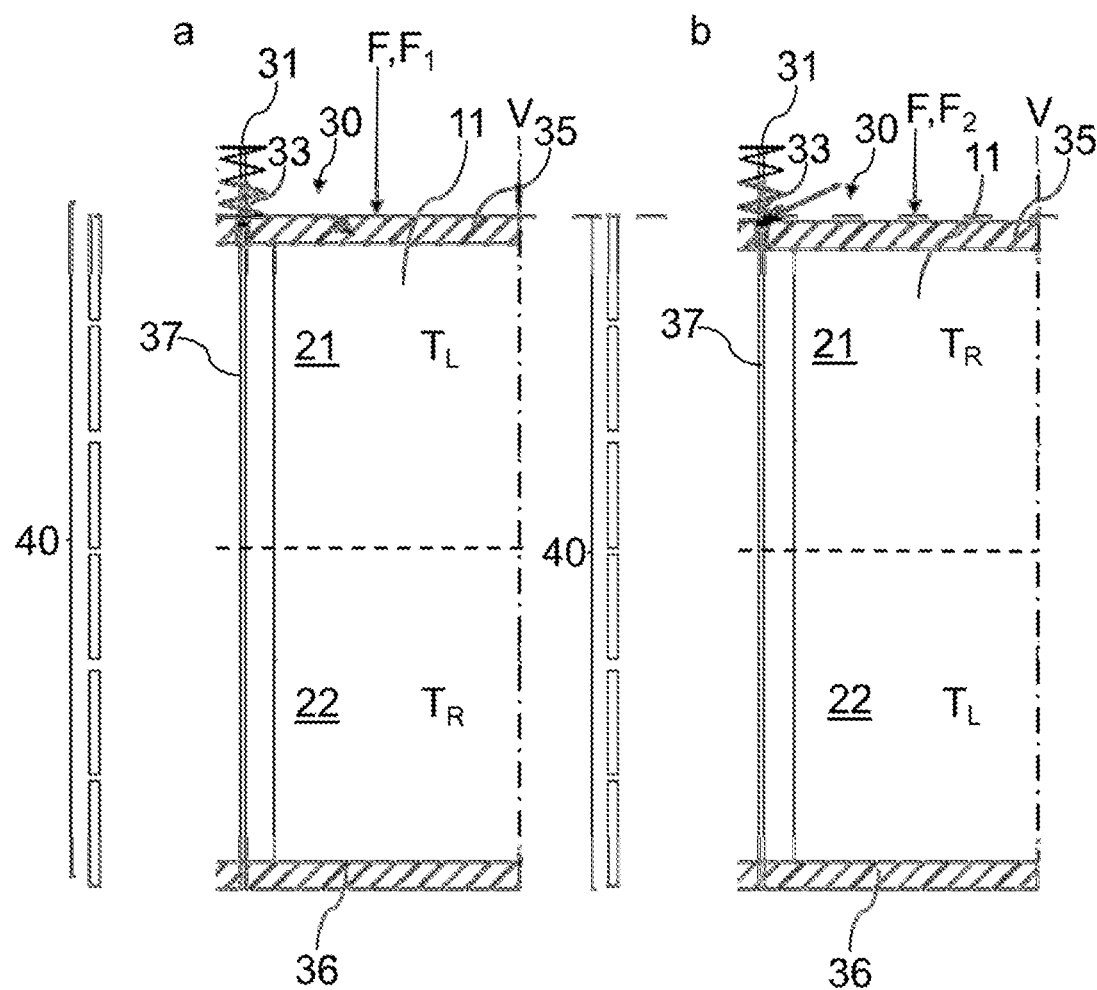
FIG. 3 shows a schematic illustration of the sequence of an example of a method according to the invention for producing a block, having two brazing steps.
Figure 4:
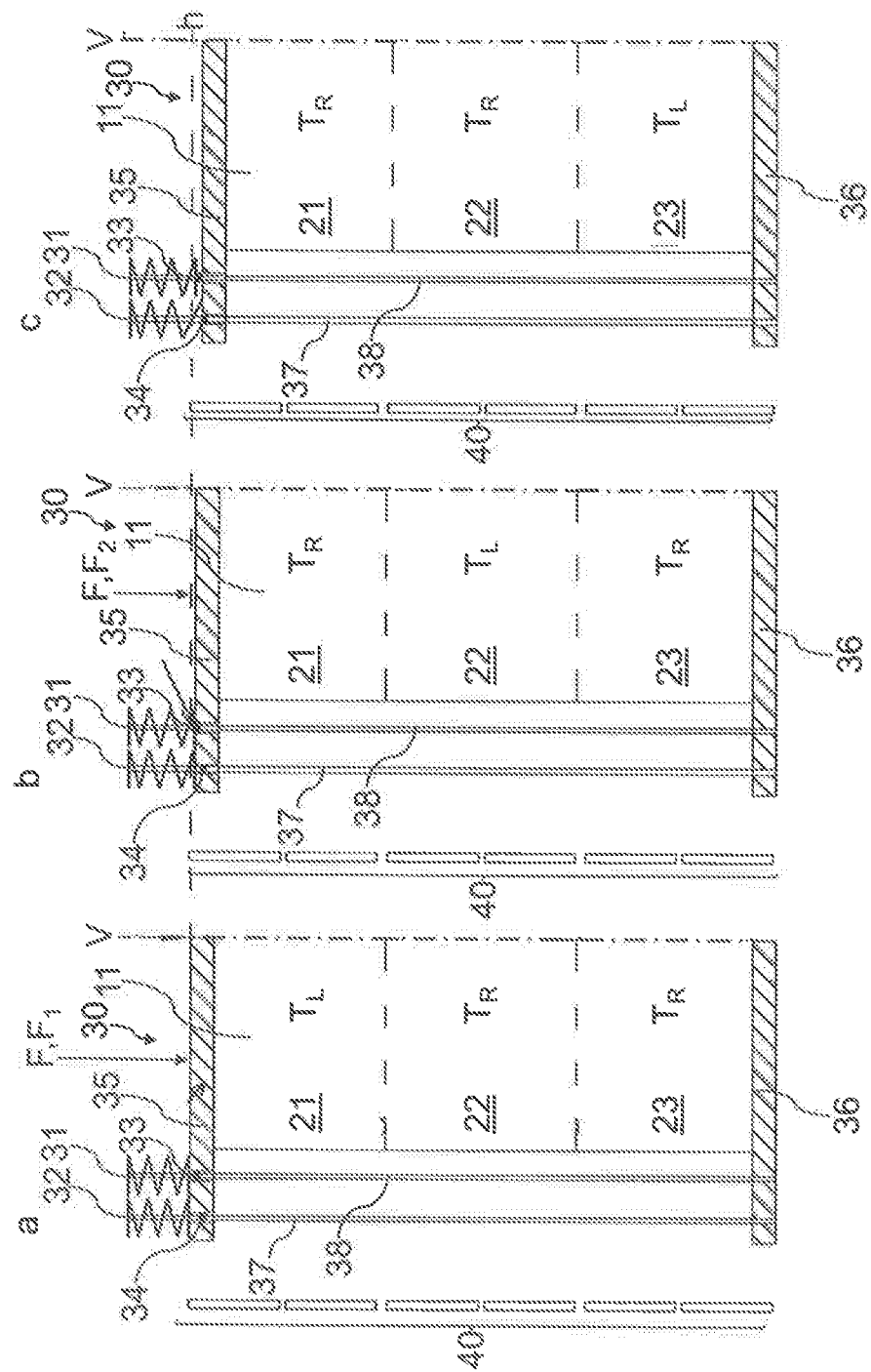
FIG. 4 shows a schematic illustration of the sequence of an example of a method according to the invention for producing a block, having three brazing steps.

FIG. 3 and FIG. 4 schematically show the sequence of the method according to the invention for producing a block 11 for a plate heat exchanger 10, for example for the plate heat exchanger 10 shown in FIG. 1. In this case, for brazing, a stack, arranged in the vertical direction V, of components of the plate heat exchanger block 11 is formed, wherein said components can be for example the partition plates 4, fins 3, distributor fins 2 and edge strips 8 shown in FIG. 1.

According to the exemplary embodiment illustrated in FIG. 3 (brazing in two sections 21, 22 of the block 11 in two steps), the stack of components is fixed in a clamping apparatus 30, in particular a clamping frame, such that, by means of a first spring 31, an external force F can be applied to the stack of components or the block 11 in the vertical direction.

In this case, the clamping apparatus 30 has a first plate 35 and a second plate 36 parallel to the first plate 35, wherein the first plate 35 is connected to the second plate 36 via a first guide 37 (for example a guide rod or guide rail), such that the first plate 35 is movable along the first guide 37, wherein the first spring 31 is configured to exert a force acting parallel to the first guide 37 (i.e. in the vertical direction V) on the first plate 35. This is achieved in particular in that the first spring 31 is connected to the first guide 37 above the first plate 35.

The block 11 is in this case subjected to the first force $F_1$ by means of the loaded spring 31 via the first plate 35.

Figure 5:
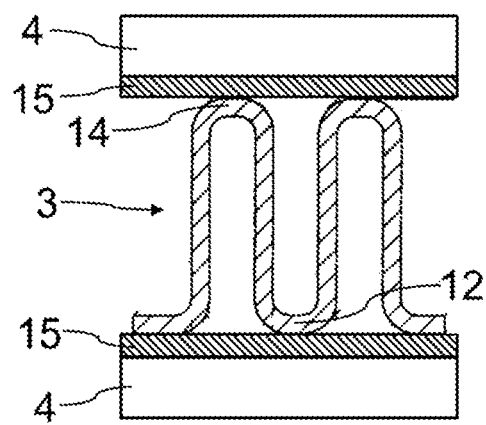
FIG. 5 shows a detail illustration of a part of a block of heating surface elements and partition plates before and after the brazing operation.
Figure 5:
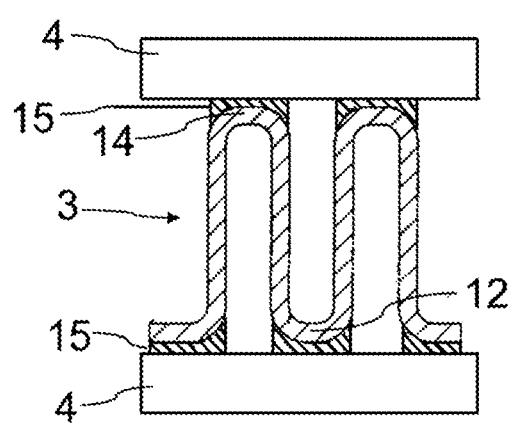

Furthermore, at the positions to be brazed in each case, a brazing material 15 (see FIG. 5) is made available and the plate heat exchanger block 11 is heated in defined sections 21, 22, 23 in the vertical direction V by means of a heating apparatus 40, in order to bring the plate heat exchanger block 11 to the brazing-material softening temperature $T_L$ at the positions to be brazed, such that the brazing material 15 melts and the corresponding components are brazed.

FIG. 3a shows a first step of the method, in which only an upper section (in this case the upper half) 21 of the block 11 is heated to the brazing-material softening temperature $T_L$, wherein a second section 22 (in this case the lower half) of the plate heat exchanger block 11 is brought to, or maintained at, a tempering temperature $T_R$ that is lower than the brazing-material softening temperature $T_L$.

In this case, during the first step, the block 11 is subjected to a first external force $F_1$ by means of the first spring 31, in order to allow the brazing of the components in the upper section 21.

During the first step, the second section 22 is at a tempering temperature $T_R$, i.e. it is heated up in particular only to such an extent that the differences in thermal expansion between the upper section 21 and the second section 22 are sufficiently small for good brazing of the entire block 11. A difference that is not too large between the brazing-material softening temperature $T_L$ and tempering temperature $T_R$ in particular prevents the corresponding sections from warping with respect to one another. However, the tempering temperature $T_R$ is kept low enough for the higher compressive strength at this temperature to prevent permanent deformation of the components, for example compression of the lamellae in the second section 22, in which both the external force F and the weight force of the upper section 21 are exerted on the second section 22.

FIG. 3b schematically shows a second step of the method according to the invention, in which the second section 22 (the lower half) of the block 11 is heated to the brazing-material softening temperature $T_L$, such that the components of the second section 22 are brazed, wherein the upper section 21 is brought to, or maintained at, a tempering temperature $T_R$.

Following the brazing of the upper section 21, the extent of the block 11 has become somewhat smaller as a result of the components, for example lamellae, being dipped in the brazing material 15 (see also FIGS. 5a and b). As a result, the first spring 31 has extended and come into abutment against a first stop 33, such that the first spring 31 is relieved of load, i.e. no longer exerts any force on the block 11. Therefore, in the second step of the method, an external force F no longer acts on the block 11. The force required for brazing the second section 22 is exerted, in this exemplary embodiment, only by the weight force of the upper section 21.

This weight force is small enough for the components in the second section 22 not to be permanently deformed, such that the components thereof are not damaged and the heat transfer capacity of the plate heat exchanger 10 is not impaired.

As an alternative to the described method, it is of course also possible, in the second step, for the block 11 to be subjected to an outer external force F, as long as the overall force on the second section 22 is small enough for the components of the block 11 not to be deformed in this section.

FIG. 4 schematically shows a further exemplary embodiment, in which three sections 21, 22, 23 of the block 11 are brazed in three steps. In this case, the stack of components is likewise fixed in a clamping apparatus 30, in particular a clamping frame. Here, the clamping apparatus has a first spring 31 and a second spring 32, which together exert an aggregated external force F in the vertical direction on the stack of components or the block 11.

In this case, the clamping apparatus 30 has a first plate 35 and a second plate 36 parallel to the first plate 35, wherein the first plate 35 is connected to the second plate 36 via a first guide 37 and a second guide 38 (for example guide rods or guide rails), such that the first plate 35 is movable along the first and second guides 37, 38, wherein the first spring 31 is configured to exert a force acting parallel to the first guide 37 (i.e. in the vertical direction V) on the first plate 35, and wherein the second spring 32 is configured to exert a force acting parallel to the second guide 38 in the vertical direction V on the first plate 35. This is achieved in particular in that the first spring 31 is connected to the first guide 37 above the first plate 35 and the second spring 32 is connected to the second guide 38 above the first plate 35. The block 11 is subjected to the first force $F_1$ by means of the loaded first and second springs 31, 32 via the first plate 35.

Likewise, at the positions to be brazed in each case, a brazing material 15 is made available and the plate heat exchanger block 11 is heated in defined sections 21, 22, 23 in the vertical direction V by means of a heating apparatus 40, in order to bring the plate heat exchanger block 11 to the brazing-material softening temperature $T_L$ at the positions to be brazed, such that the brazing material 15 melts and the corresponding components are brazed.

Here, FIG. 4a shows a first step of the method, in which only an upper section (in this case the upper third) 21 of the plate heat exchanger block 11 is heated to the brazing-material softening temperature $T_L$, wherein a middle section 22 (in this case the middle third) and a lower section 23 (in this case the lower third) of the plate heat exchanger block 11 are brought to, or maintained at, a tempering temperature $T_R$ that is lower than the brazing-material softening temperature $T_L$.

In this case, during the first step, the plate heat exchanger block 11 is subjected to a first external force $F_1$ by means of the first spring 31 and the second spring 32, in order to allow the brazing of the components in the upper section 21.

During the first step, the middle section 22 and the lower section 23 are at a tempering temperature $T_R$, i.e. they are heated up in particular only to such an extent that the differences in thermal expansion between the upper section 21 and the middle section 22 and lower section 23 are sufficiently small for good brazing of the entire block 11. A difference that is not too large between the brazing-material softening temperature $T_L$ and tempering temperature $T_R$ in particular prevents the corresponding sections from warping with respect to one another. However, the tempering temperature $T_R$ is kept low enough for the higher compressive strength at this temperature to prevent permanent deformation of the components, for example compression of the lamellae in particular in the lower section 23, in which both the external force F and the weight force of the upper section 21 and of the middle section 22 are exerted.

FIG. 4b schematically shows a second step of the method according to the invention, in which the middle section 22 of the plate heat exchanger block 11 (in this case the middle third) is heated to the brazing-material softening temperature $T_L$, such that the components of the middle section 22 are brazed, wherein the upper section 21 and the lower section 23 are brought to, or maintained at, a tempering temperature $T_R$.

As shown in FIG. 4b, the block 11 has shrunk somewhat following the brazing of the upper section 21 as a result of the components, for example lamellae, being dipped in the brazing material 15, i.e. the extent of the block 11 in the vertical direction V has become smaller compared with the height h, that is to say the original extent of the block 11 before the brazing of the upper section 21 (see also FIGS. 5a and 5b). The springs 31, 32 which press on the clamping apparatus 30 have extended as a result. As a result of this extension, the first spring 31 has come into abutment against a first stop 33, such that the first spring 31 is relieved of load, i.e. no longer exerts any force on the block 11. Consequently, only the second spring 32 exerts a second force $F_2$ in the vertical direction on the block 11, this force being lower than the first external force $F_1$, which is exerted on the block 11 by means of the two springs 31, 32 in the first step (see FIG. 2a).

The force, required for brazing the middle portion 22, on the block 11 is provided by the sum of the second force $F_2$ and the weight force of the upper section 21 located thereabove. This overall force can advantageously be set by the amount of the second external force $F_2$ such that the components in the middle section 22 and in the lower section 23 are not permanently deformed, and so the components are not damaged and the heat transfer capacity of the plate heat exchanger 10 is not impaired. FIG. 4c schematically shows a third step of the method according to the invention, in which the lower section 23 (in this case the lower third) of the block 11 is heated to the brazing-material softening temperature $T_L$, such that the components of the lower section 23 are brazed, wherein the upper section 21 and the middle section 22 are brought to, or maintained at, a tempering temperature $T_R$.

Following the brazing of the middle section 22, the extent of the block 11 has become somewhat smaller again as a result of the components, for example lamellae, being dipped in the brazing material 15. As a result, the second spring 32 has extended further and come into abutment against a second stop 34, such that the second spring 32 is also relieved of load, i.e. no longer exerts any force on the block 11. Therefore, in the third step of the method, an external force F no longer acts on the block 11. The force required for brazing the lower section 23 is exerted, in this exemplary embodiment, only by the weight force of the upper section 21 and of the middle section 22.

This weight force is small enough for the components in the lower section 23 not to be permanently deformed, such that the components thereof are not damaged and the heat transfer capacity of the plate heat exchanger 10 is not impaired.

As an alternative to the described method, it is of course also possible, in the third step, for the block 11 to be subjected to an outer external force F, as long as the overall force on the lower section 23 is small enough for the components of the block 11 not to be deformed in this section.

FIGS. 5a and 5b show a detail of the block 11 during the brazing operation. In this case, two partition plates 4 and a heating surface element 3 arranged between the partition plates 4 are illustrated. Located between the partition plates 4 and the heating surface element 3 is a layer of brazing material 15. This can have been clad for example on the partition plates 4 or it is possible for separate layers of the brazing material 15 to be arranged between the partition plates 4 and the heating surface element 3 during the stacking of the block 11.

FIG. 5a shows the state before the brazing of the illustrated part of the block 11 and FIG. 5b shows the state in which the heating surface element 3 has been brazed together with the adjacent partition plates 4. It is apparent from the comparison of FIGS. 5a and 5b that those valleys 12 and peaks 14 of the heating surface element that come into contact with the respectively bearing partition plates 4 in the stacked block 11 have dipped into the liquefied brazing material during brazing, such that the height of the block 11 has reduced (see also FIG. 3 and FIG. 4).

| List of reference signs | |
|---|---|
| 1 | Heat exchange passage |
| 2 | Distributor fin |
| 3 | Heating surface element or fin |
| 4 | Partition plate |
| 5 | Cover plate |
| 6 | Port |
| 7 | Manifold |
| 8 | Edge strip (side bar) |
| 9 | Opening |
| 10 | Plate heat exchanger |
| 11 | Block |
| 12 | Valley |
| 13 | Flank |
| 14 | Peak |
| 15 | Brazing material |
| 21 | Upper section |
| 22 | Middle section |
| 23 | Lower section |
| 30 | Clamping apparatus |
| 31 | First spring |
| 32 | Second spring |
| 33 | First stop |
| 34 | Second stop |
| 35 | First plate |
| 36 | Second plate |
| 37 | First guide |

| | |
|---|---|
| 38 | Second guide |
| 40 | Heating apparatus |
| A, B, C, D, E | Fluid |
| F | Force |
| $F_1$ | First force |
| $F_2$ | Second force |
| h | Height |
| $T_L$ | Brazing-material softening temperature |
| $T_R$ | Tempering temperature |
| V | Vertical direction |

The invention claimed is:

1. A method for producing a brazed block (11) for a plate heat exchanger (10), wherein the block (11) has a plurality of heat exchange passages (1) for indirect heat exchange between at least two fluids (A, B, C, D, E), and wherein a plurality of partition plates (4) and heat-conducting structures (2, 3) are stacked in a vertical direction (V) in the block (11), and brazing material (15) is disposed between adjacent partition plates (4) and heat-conducting structures (2, 3), said method comprising:

(a) subjecting the block (11) in the vertical direction (V) to a first force ($F_1$) which acts on the block (11) from the outside, and heating a first, upper section (21) of the block (11) to a brazing-material softening temperature ($T_L$) at which the brazing material (15) softens, such that the upper section (21) is brazed, and wherein, at the same time, a second section (22) of the block (11), which adjoins the first section (21) downwardly in the vertical direction (V), is heated to a tempering temperature ($T_R$) which is lower than the brazing-material softening temperature ($T_L$) and above an ambient temperature and at which the brazing material (15) does not soften, and (b) subsequently not subjecting the block (11) in the vertical direction (V) to any force from the outside or subjecting the block to a second force ($F_2$) which acts on the block (11) from the outside, wherein the second force ($F_2$) is lower than the first force ($F_1$), and heating the second section (22) of the block (11) to a brazing-material softening temperature ($T_L$) at which the brazing material (15) softens, such that the second section (22) is brazed, and wherein, at the same time, reducing the temperature of the first section (21) to a tempering temperature ($T_R$) which is lower than the brazing-material softening temperature ($T_L$) and above the ambient temperature and at which the brazing material (15) hardens or does not soften.

2. The method according to claim 1, wherein the first section (21) is formed by an upper half and the second section (22) by a lower half of the block (11).

3. The method according to claim 1, wherein the block (11) comprises a further, third section (23) which adjoins the second section (22) downwardly in the vertical direction (V), wherein, following (b), said method further comprises:

(c) not subjecting the block to any force from the outside, and bringing the third section of the block (11) to a brazing-material softening temperature ($T_L$) at which the brazing material (15) softens, and, at the same time, bringing the second section (22) to a tempering temperature ($T_R$) which is lower than the brazing-material softening temperature and above the ambient temperature and at which the brazing material (15) hardens or does not soften.

4. The method according to claim 3, wherein the first section (21) is formed by an upper third of the block (11), and wherein the second section (22) is formed by a middle third of the block (11), and wherein the third section (23) is formed by a lower third of the block (11).

5. The method according to claim 1, wherein the first force ($F_1$) and the second force ($F_2$) are applied to the block (11) by means of at least one loaded spring (31, 32), wherein the at least one loaded spring (31, 32) acts from above on an outermost, upper partition plate (4) of the block.

6. The method according to claim 1, wherein, during the brazing of the first section (21) in step (a), the first force is applied to the block (11) by means of a first loaded spring (31) and a second loaded spring (32) and said first force is an aggregated force ($F_1$) corresponding to the sum of the forces exerted on the block (11) by the first loaded spring (31) and the second loaded spring (32), and wherein, during the brazing of the second section (22), the second force is applied to the block (11) only by means of the second loaded spring (32).

7. The method according to claim 6, wherein, following the brazing of the first section (21) in (a), the first spring (31) comes to bear against a first stop (33), such that the first spring (31) no longer acts on the block (11), and wherein, following the brazing of the second section (22), the second spring (32) comes to bear against a second stop (34), such that the second spring (32) no longer acts on the block (11).

8. The method according to claim 1, wherein the heat-conducting structures (2, 3) are formed by corrugated plates (2, 3).

9. The method according to claim 1, wherein, during the stacking of the partition plates (4) and heat-conducting structures (2, 3), edge strips (8) are arranged between adjacent partition plates (4), said edge strips (8) terminating each particular heat exchange passage (1) toward the outside.

10. The method according to claim 1, wherein the tempering temperature ($T_R$) is in a range from 5° C. to 150° C. below the brazing-material softening temperature ($T_L$).

11. The method according to claim 1, further comprising, following (a) and (b), welding at least one port (6) and/or at least one manifold (7) onto the block (11).

12. The method according to claim 1, wherein the tempering temperature ($T_R$) is 30° C. to 100° C. below the brazing-material softening temperature ($T_L$).

13. The method according to claim 3, wherein during (c) the first section (21) is also brought to a tempering temperature ($T_R$) which is lower than the brazing-material softening temperature and above the ambient temperature and at which the brazing material (15) hardens or does not soften.

14. An apparatus for producing a brazed block for a plate heat exchanger according to the method of claim 1, said apparatus comprising:

a heating apparatus configured to heat the first section (21) of the block (11) to the brazing-material softening temperature ($T_L$) at which the brazing material (15) softens, and simultaneously heat second section (22) of the block (11) to a tempering temperature, wherein said heating apparatus is also configured to subsequently heat the second section (22) to the brazing-material softening temperature ($T_L$) and bring the upper section (21) to a tempering temperature, which is lower than the brazing-material softening temperature, and above the ambient temperature, and a clamping apparatus (30) configured to subject the block (11) in the vertical direction (V) to the first force ($F_1$) acting on the block (11) from the outside, while the upper section (21) of the block (11) is heated to the brazing-material softening temperature ($T_L$), and to not subject the block (11) in the vertical direction (V) to any force from the outside or to subject the block to the second force ($F_2$), while the second section (22) of the block (11) is heated to the brazing-material softening temperature ($T_L$), wherein the second force ($F_2$) is lower than the first force ($F_1$).

* * * * *